(12) United States Patent
Marshall et al.

(10) Patent No.: US 11,708,159 B2
(45) Date of Patent: Jul. 25, 2023

(54) COMPACT AERIAL MISSION MODULAR MATERIAL HANDLING SYSTEM

(71) Applicant: Urbineer Inc, Los Angeles, CA (US)

(72) Inventors: Stuart Marshall, Los Angeles, CA (US); Arakel Melidonian, Chino Hills, CA (US); Sean Kirkhuff, Thousand Oaks, CA (US); Eric Marc-Aurele, San Diego, CA (US)

(73) Assignee: Urbineer Inc, Los Angeles, CA (US)

(*) Notice: Subject to any disclaimer, the term of this patent is extended or adjusted under 35 U.S.C. 154(b) by 0 days.

(21) Appl. No.: 17/546,370

(22) Filed: Dec. 9, 2021

(65) Prior Publication Data
US 2022/0177124 A1 Jun. 9, 2022

Related U.S. Application Data

(60) Provisional application No. 63/123,056, filed on Dec. 9, 2020.

(51) Int. Cl.
*B64C 29/00* (2006.01)
*B64D 29/02* (2006.01)
(Continued)

(52) U.S. Cl.
CPC .......... *B64C 29/0033* (2013.01); *B60L 53/53* (2019.02); *B64C 25/10* (2013.01); *B64C 27/56* (2013.01); *B64D 9/00* (2013.01); *B64D 27/24* (2013.01); *B64D 29/02* (2013.01); *B60L 2200/10* (2013.01)

(58) Field of Classification Search
CPC ..... B64C 29/0033; B64C 25/10; B64C 27/56; B64C 27/54; B64C 27/57; B64D 9/00; B64D 27/24; B64D 29/02; B60L 53/53; B60L 2200/10
See application file for complete search history.

(56) References Cited

U.S. PATENT DOCUMENTS 10,189,565 B2   1/2019   Patterson et al.
10,556,679 B2   2/2020   Val Petrov
(Continued)

FOREIGN PATENT DOCUMENTS

CN   105059542 B   9/2017
CN   110466750 A   11/2019
(Continued)

OTHER PUBLICATIONS

International Search Report and Written Opinion dated Mar. 18, 2022 in corresponding International Patent Application No. PCT/US2021/062590; 9 pages.

*Primary Examiner* — Rodney A Bonnette
(74) *Attorney, Agent, or Firm* — Maier & Maier, PLLC

(57) ABSTRACT

According to at least one exemplary embodiment, a method, system and apparatus for an aircraft may be shown and described. An exemplary embodiment may be an autonomous aircraft which can vertically takeoff and land (VTOL). The VTOL aircraft may have a modular pod which carries a removable payload. The entire VTOL aircraft may be portable. An exemplary embodiment may fit into a standard sized freight container. A propulsion system may be based on distributed electric propulsion. An exemplary embodiment may implement variable pitch propellers and collective pitch variation.

13 Claims, 14 Drawing Sheets

(51) Int. Cl.
*B64D 27/24* (2006.01)
*B64C 25/10* (2006.01)
*B60L 53/53* (2019.01)
*B64D 9/00* (2006.01)
*B64C 27/56* (2006.01)

(56) References Cited

U.S. PATENT DOCUMENTS

| | | |
|---|---|---|
| 2003/0033798 A1 | 2/2003 | Dickau |
| 2009/0152391 A1 | 6/2009 | McWhirk |
| 2010/0193644 A1 | 8/2010 | Karem |
| 2016/0114887 A1 | 4/2016 | Zhou et al. |
| 2016/0311529 A1 | 10/2016 | Brotherton-Ratcliffe et al. |
| 2017/0203839 A1 | 7/2017 | Giannini et al. |
| 2018/0339769 A1* | 11/2018 | McCullough ......... B64C 27/605 |
| 2018/0339771 A1 | 11/2018 | Oldroyd et al. |
| 2020/0361324 A1* | 11/2020 | Evans ..................... B60P 3/007 |
| 2021/0107620 A1* | 4/2021 | Weekes ................... B64D 9/00 |

FOREIGN PATENT DOCUMENTS

| | | |
|---|---|---|
| CN | 210416978 U | 4/2020 |
| RO | 133556 A2 | 8/2019 |
| WO | 2018106137 A2 | 6/2018 |

\* cited by examiner

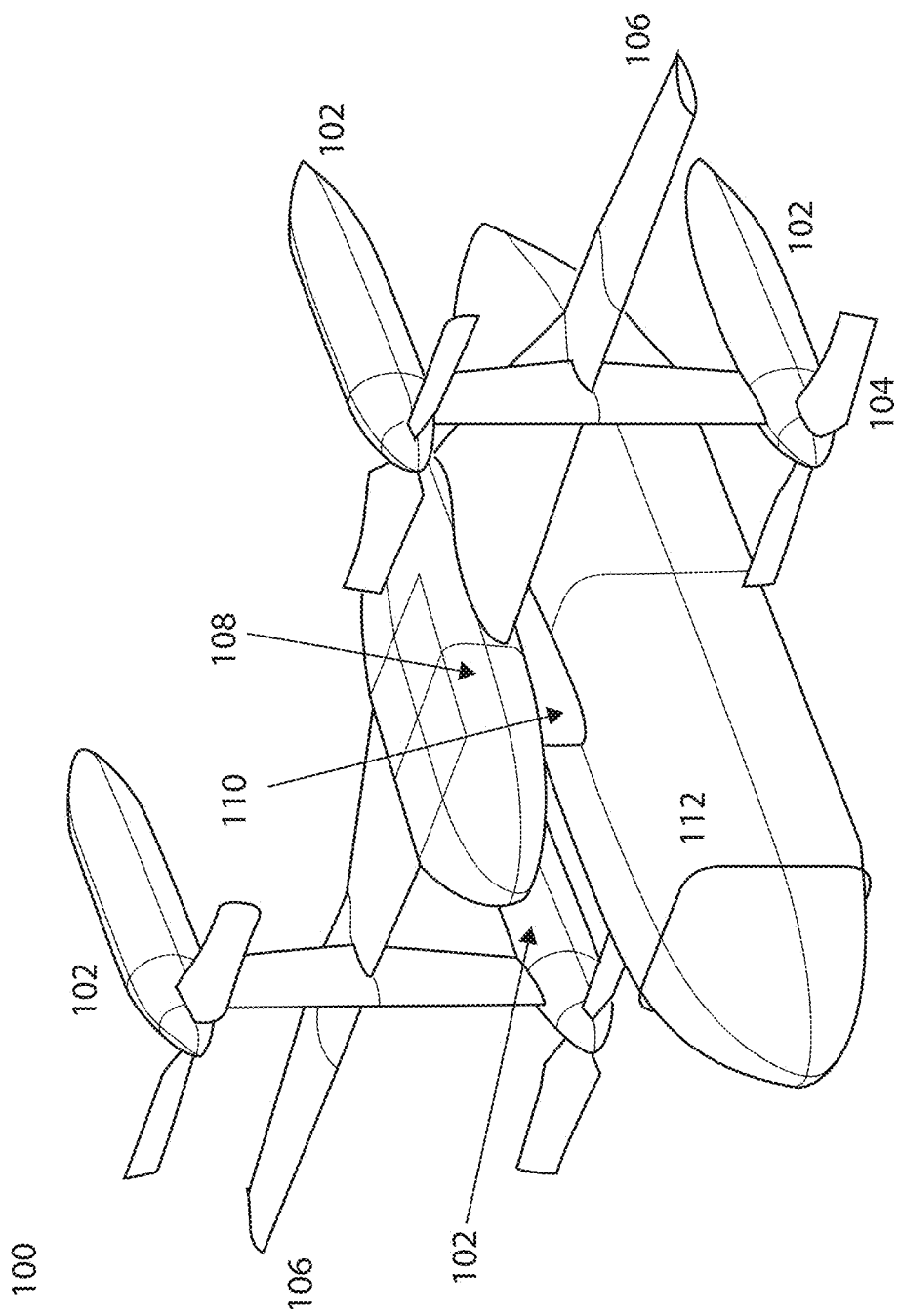

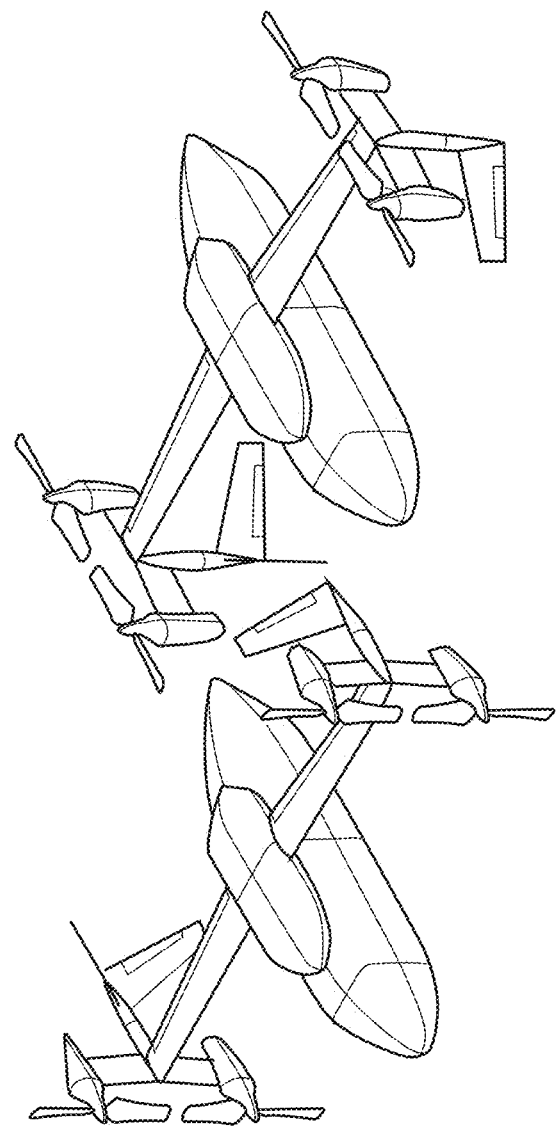
Fig. 3C
Fig. 3B
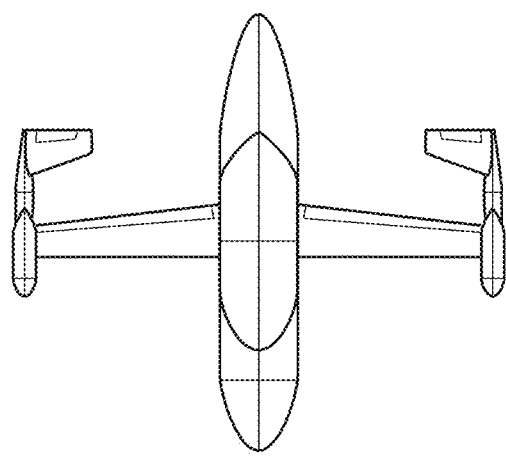
Fig. 3A

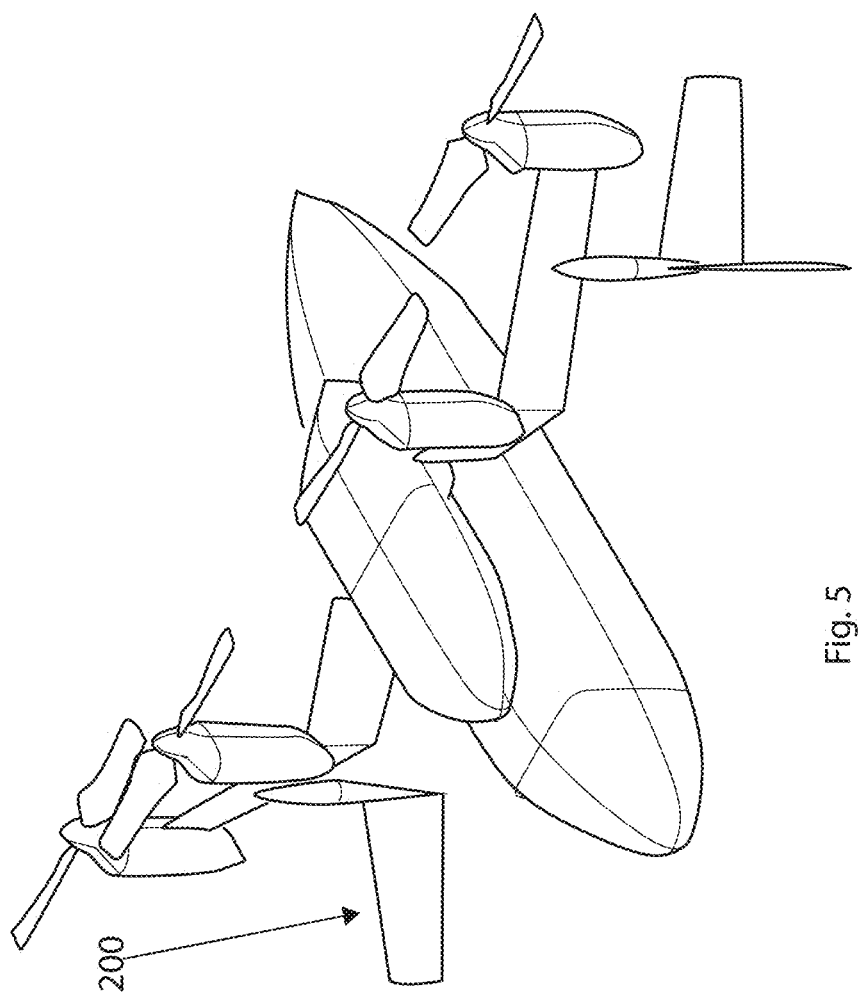

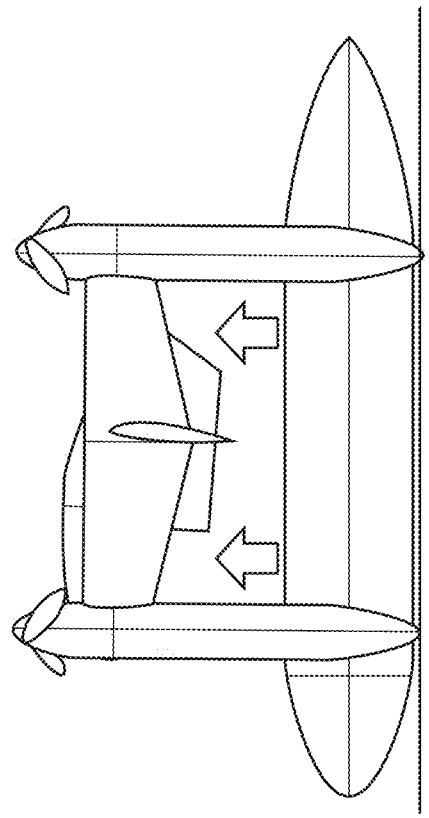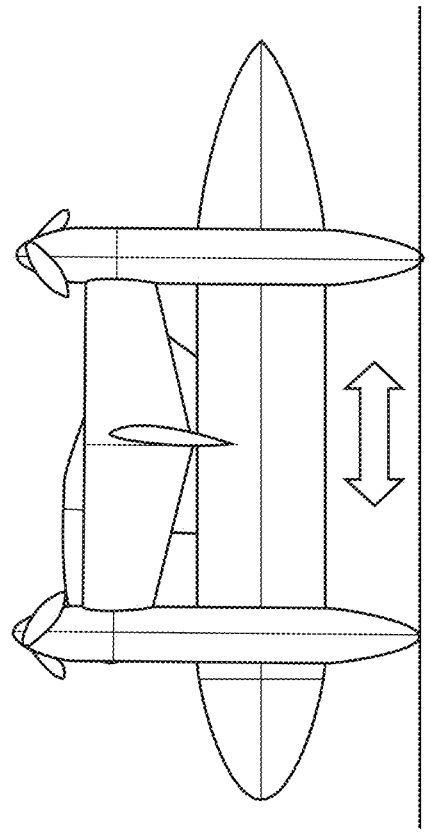
Fig. 8

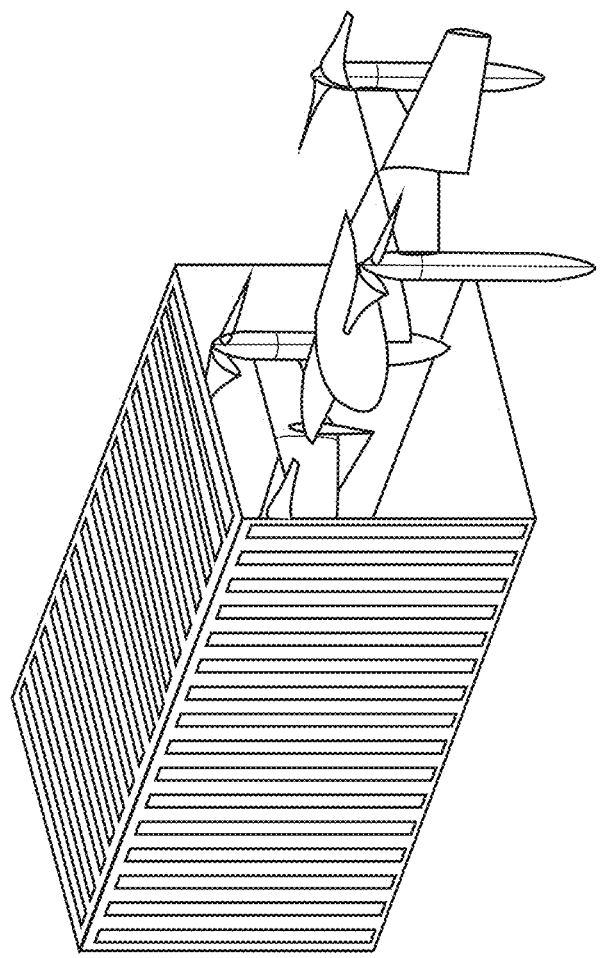
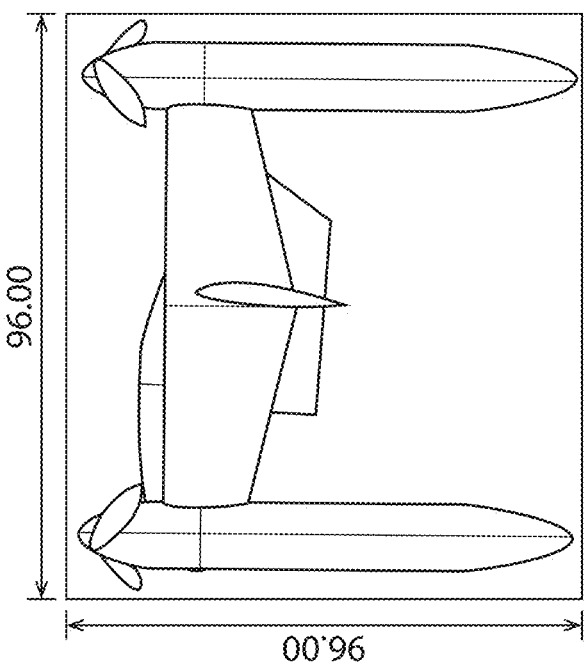
Fig. 9

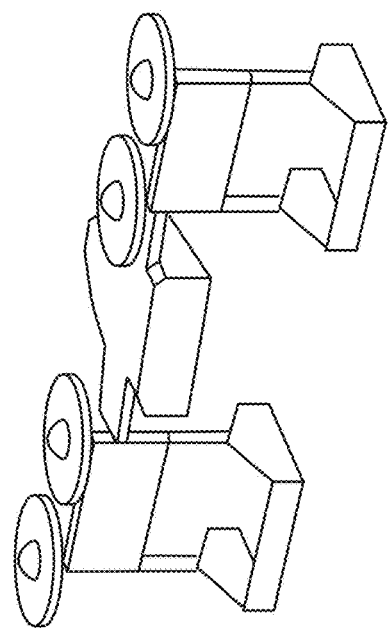
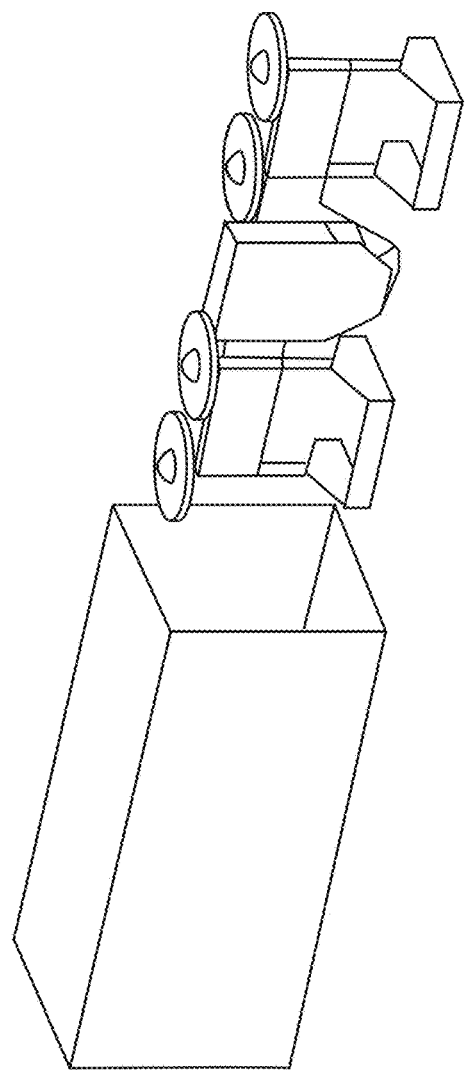
Fig. 10

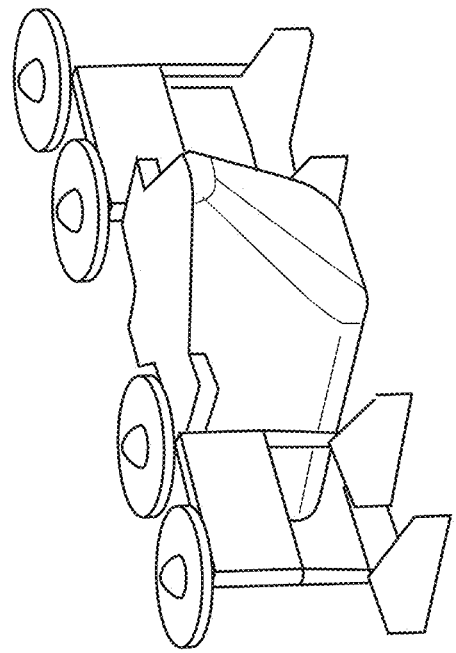
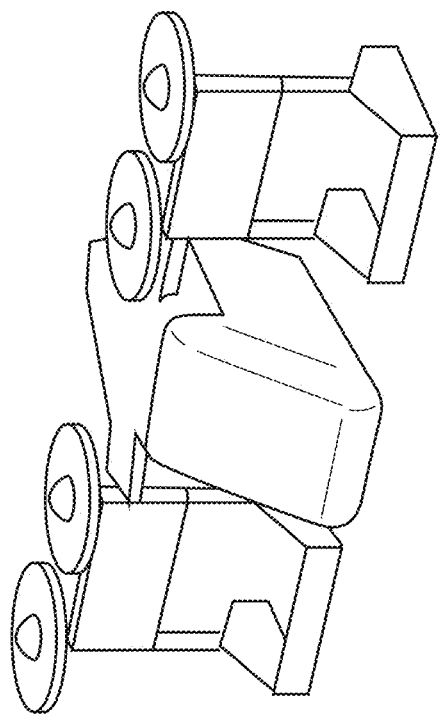
Fig. 11

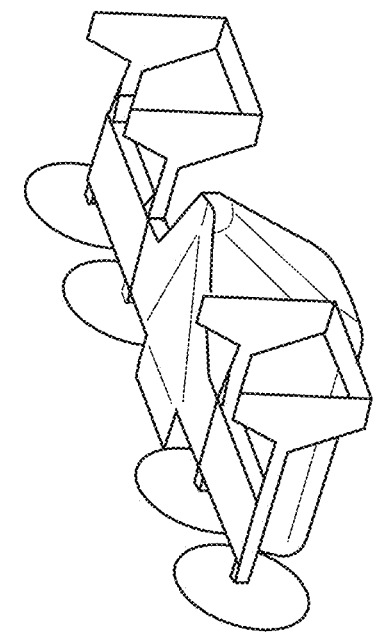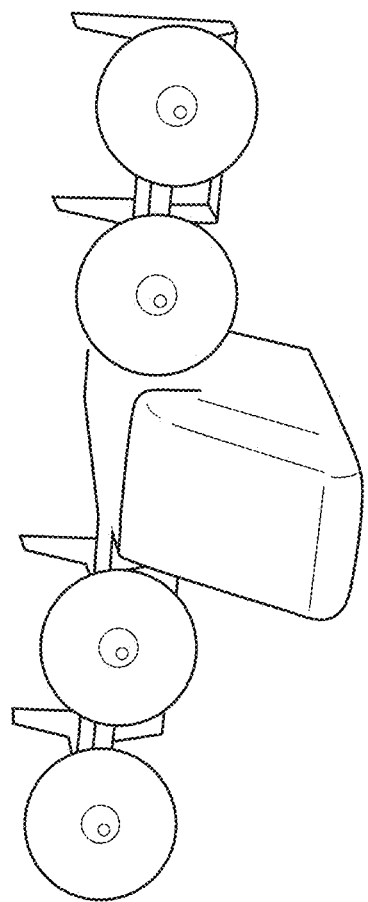
Fig. 12

COMPACT AERIAL MISSION MODULAR MATERIAL HANDLING SYSTEM

FIELD

Exemplary embodiments relate to the field of air travel, namely, vertical takeoff and landing vehicles.

BACKGROUND

Many vertical takeoff and landing (VTOL) vehicles use separate propulsors for each vertical and forward motion with rotor/propeller blades optimized for their unique airspeed and thrust requirements. This approach simplifies vehicle control but adds parasitic weight in the form of redundant systems. Thus, stable hovering is achieved by varying only the speed of the propulsors, and changes in rotational speed take time and limit controllability. To transition to forward flight, a second propulsive system is activated, and those propulsors used in vertical flight are deactivated. In both flight segments, an unused propulsion system is carried by the vehicle and thus the overall efficiency is decreased.

Conversely, the use of one or more fixed pitch propulsors for both vertical and forward flight has a significant negative effect on propulsive efficiency; a blade optimized for vertical hovering cannot be used efficiently in high-speed forward flight.

Regarding cargo operations via aircraft, payload has historically been carried within an open bay in the fuselage of the aircraft. This approach requires loading and unloading to take place with the vehicle sitting, out of use. The process is very sensitive to the relative weight and location of the cargo with respect to the vehicle center of gravity. Furthermore, even vehicles with separate cargo pods do not provide significant adjustment for the vehicle sensitivity to center of gravity of the payload. Such vehicles allow just a single pod shape/volume for each vehicle airframe and a fixed or limited adjustment to location of the cargo pod with respect to the airframe.

The main source of downtime for electric air vehicles of any kind is recharging of the battery. This process can take several hours and far outweighs the time spent packing or unpacking a vehicle.

Conventional aircraft occupy a large footprint on the ground and are therefore challenging and expensive to store and to transport. Naval aircraft intended for use on aircraft carriers typically address this issue with folding wing features, but those systems are typically a very heavy addition onto an existing airframe where it serves no other purpose than to minimize footprint.

Karem Aircraft, Inc. has several patents in related areas. The relevant art may be an eVTOL, tiltrotor or tilt-wing vehicle that uses a mechanism that allows for the pitch of each blade to be controlled independently, rather than collectively. Bell Helicopter/Textron, Inc., also have several patents in related areas. The relevant art may describe an APT vehicle which may implement thrust vectoring by varying RPM. Elroy Air may have an unmanned cargo delivery aircraft that implements the redundant vertical/horizontal distributed electric propulsion systems described above. Joby Aero, Inc. is another primary contender in the eVTOL space, and their rotor blade pitch is adjusted in response to cone angle of the blades to allow the blades to fold backward against the nacelle for minimum drag when the propulsor is not in use.

SUMMARY

According to at least one exemplary embodiment, a method, system, and apparatus for an aircraft may be shown and described. An exemplary embodiment may be an autonomous electric, hydrogen-electric, and/or hybrid-electric aircraft which can vertically takeoff and land (VTOL). The VTOL aircraft may have a modular pod which carries a removable payload. The entire VTOL aircraft may be portable. An exemplary embodiment may fit into a standard sized freight container with limited to no break-down. A propulsion system may be based on distributed electric propulsion. An exemplary embodiment may implement variable pitch propellers and collective pitch variation.

Variable pitch propellers may be capable of hovering as well as high-speed forward flight. An exemplary embodiment may use the same motors for both hovering and cruising, thus eliminating the need for additional motors or systems, reducing vehicle weight, and increasing efficiency. In forward flight, an exemplary propeller pitch and rotation rate may be set to provide peak efficiency for a required amount of thrust. Hovering figures of merit, or efficiency, may increase as disk loading decreases. Large-diameter rotors may have high moments of inertia and thus may be slower when changing speed in response to motor torque. Variable pitch actuation may allow the propeller system to change the thrust and torque of a propeller with less delay, thus improving controllability, which may allow an aircraft to fly in an unstable configuration or with reduced stability. For example, the use of more efficient vehicle layouts, such as a tailless configuration which may be too unstable to implement in other systems, may be implemented in an exemplary embodiment.

Collective pitch control in combination with variable speed can offer unique advantages in the control and efficiency of a VTOL aircraft. The use of collective pitch control maximizes the efficiency of both hover and forward flight and provides a more responsive control for thrust vectoring than varying RPM alone. This added control responsiveness may allow for further reduction in drag and improvement in efficiency by the elimination of the traditional tail and control surfaces normally used to achieve stable flight.

An exemplary embodiment may include a removable pod. The pod may be used for specific missions, such as for handling cargo, medevac, and other logistical needs. The pod may be mechanically and electrically attached to an exemplary air vehicle. In an exemplary embodiment, the pod may be attached to the bottom of the vehicle, at the base of a pylon which interfaces with the aircraft. The connection to the pylon may allow for flexibility in payload size and shape.

In an exemplary embodiment, energy storage, for example batteries and/or a range-extending hybrid power system may be built into the removeable mission modular payload pods so that an exemplary system includes one airframe and multiple pods that can provide mission specific configurations and greater adjustment of the weight relative to the center of gravity. With this exemplary embodiment, total downtime may be minimized and the potential mission throughput over any given time may be maximized. Additionally, the mission modular pod may be attached to a pylon beneath the fuselage in a way that allows for adjustment forward or aft with respect to the airframe. This adjustability allows even less time to be taken in loading and unloading the pods and a greater flexibility to the size and shape of payloads which can be accommodated. Attachment at the pylon may also interface with a variety of pod sizes and shapes.

The pylon may include motors for translating the payload in the fore or aft direction with respect to the vehicle. By moving the payload, an exemplary embodiment may efficiently handle a wide range of payload shapes and sizes. A differently-shaped payload may have a different center of gravity, and the pylon may position the payload such that the center of gravity is in an optimal position. While a payload on a typical aircraft may require the person loading or unloading it to calculate and consider weight distribution in order to ensure the vehicle is balanced, an exemplary embodiment may instead adjust the payload using the pylon to position the center of gravity.

In another exemplary embodiment, the payload may contain energy storage for the air vehicle. The energy storage pod may be electrically connected to the aircraft. One pod may be loaded and charged while another pod is delivered, thus minimizing the operational downtime between flights by minimizing recharge time. Distributed electric propulsion may be implemented. The systems may be controlled by an autonomous system with autopilot technology.

Typical aircraft may require a large footprint to carry a large payload. This may be due to the propulsion layout and stability characteristics developed around limitations of internal combustion engines and human pilots. The footprint may refer to the size and shape of the aircraft when on the ground. Exemplary embodiment may be deployed in areas where available ground space is limited, such as, for example, densely populated metropolitan areas. By excluding or limiting a tail area, an exemplary embodiment may also be easier to load and unload. Typical aircraft require large tail/empennage surfaces in order to stabilize the vehicle. An exemplary embodiment may instead stabilize the load via thrust vector controls. An autonomous system may stabilize the vehicle and balance the load.

Further, an exemplary embodiment may be stored in a compact area, such as on a military base or ship. Landing gear may be integrated into the motor pylons, which may be rotated to the landing configuration through the tilt rotor and/or tilt wing functions. While in the landed position, an exemplary embodiment may support the loading or unloading of a payload from the front or aft side of the vehicle. Loading and unloading may be accomplished by personnel or by unmanned ground vehicles. The single wing tilt vehicle layout may eliminate any obstructions to the cargo bay, thus facilitating loading and unloading of the payload.

An exemplary embodiment may implement a tilting wing to enable vertical takeoff and landing and horizontal flight. The wing may incorporate landing gear. With limited or no tail or control surfaces, the footprint and overall height may be minimized. Thus, an exemplary embodiment may fit comfortably into a 20 ft ISO container, whereas comparable vehicles may be significantly larger and thus may be too large to fit into an ISO container and/or may require significant disassembly based on overall vehicle size.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 1A shows an exemplary embodiment of an aircraft.

FIG. 3A is a top view of an exemplary embodiment of an aircraft.

FIG. 3B shows the aircraft of FIG. 3A with an exemplary wing structure in a horizontal flying position.

FIG. 3C shows the aircraft of FIG. 3A with an exemplary wing structure in a vertical flying position.

FIG. 5 shows another exemplary embodiment of an aircraft in the vertical takeoff and landing position.

FIG. 8 shows an exemplary pod attachment procedure.

FIG. 9 shows an exemplary embodiment of an aircraft in the parking position which fits into a standard 20-foot ISO container.

FIG. 10 shows another exemplary embodiment of an aircraft in the parking position which fits into a standard 20-foot ISO container.

FIG. 11 shows another exemplary embodiment of an aircraft in the vertical takeoff and landing position.

FIG. 12 shows the exemplary embodiment of FIG. 11 in the horizontal flight position.

DETAILED DESCRIPTION

Figure 1B:
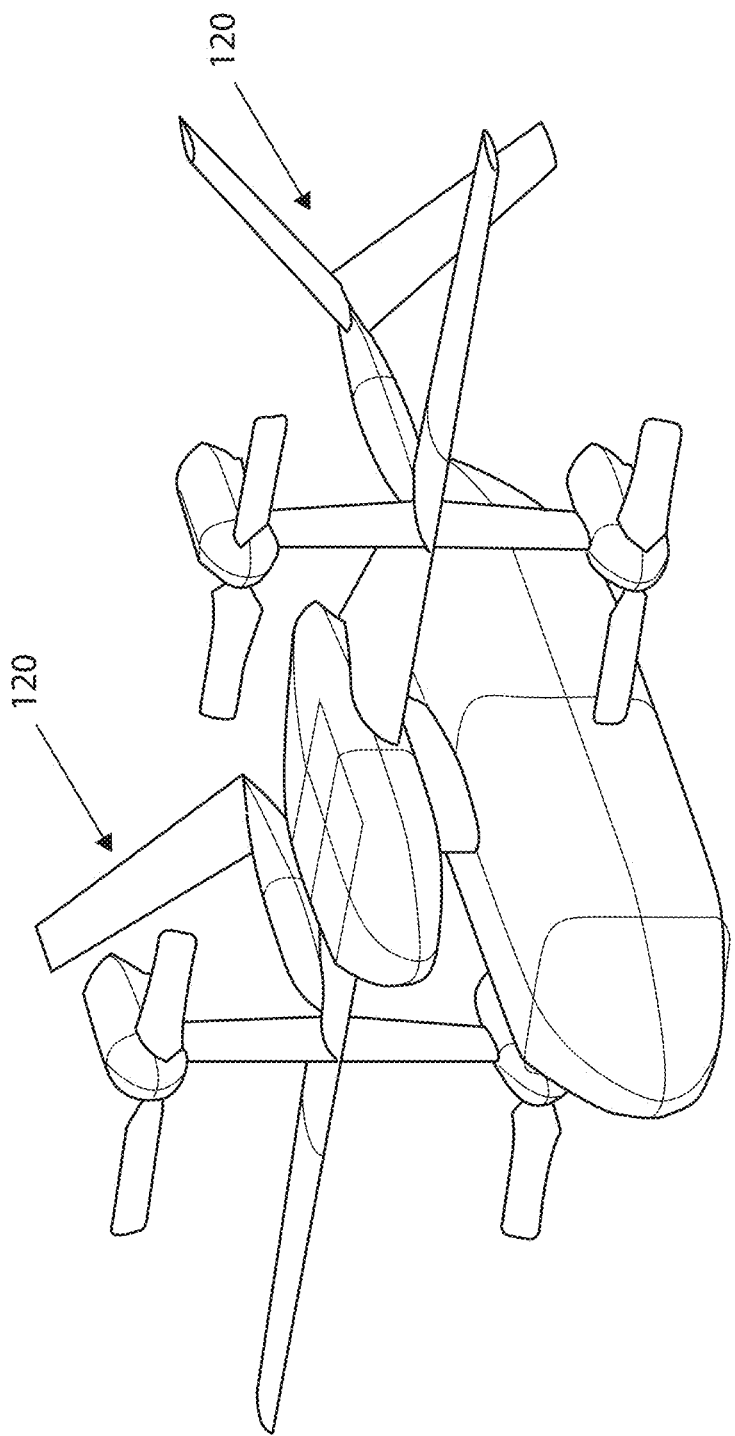
FIG. 1B shows another exemplary embodiment of an aircraft.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

An exemplary embodiment may provide an aerial vehicle capable of vertical takeoffs and landings. An exemplary embodiment may implement a multi-copter configuration for takeoff and landing and may transition to a wing-borne cruise mode. One exemplary embodiment may implement a tiltrotor/tiltwing, however other configurations may be contemplated. To maintain control throughout the flight the collective pitch of the propellers may be varied to control motion about the three axes of rotation. Collective pitch actuation may serve the same purpose as varying propeller rotational speed in a conventional multi-copter. The variable pitch control could be augmented by varying propeller rotational speed in some cases. A flight controller may be incorporated that monitors the vehicles state and controls the pitch angle of each propeller individually in order to stabilize an exemplary vehicle. In an exemplary embodiment, the flight controller may control the rotational speed of each rotor or connected group of rotors. By using a multi-copter like control scheme in all phases of flight, an exemplary embodiment may operate without, or with limited need for, traditional control surfaces, thus reducing the drag associated with control surface gaps, hinges, and deflection.

An exemplary embodiment may incorporate an optionally removeable mission modular pod. The pod may be mechanically and electrically attached to the bottom of the air vehicle at the base of a pylon. The pylon may include a standard interface that permits a variety of pod designs for cargo carrying or any other payload type including, medevac, Intelligence-Surveillance-Reconnaissance (ISR) or weaponized payloads. The flexibility in payloads may be supplemented by a rail or other transport/adjustment system built into the pylon and/or the pod that may allow translation of the payload in the fore/aft direction with respect to the air vehicle. This adjustment of the payload location may be manual, or may be autonomously performed by the air vehicle to set its own center of gravity within calculated bounds. The adjustment may be made on the ground prior to takeoff and can enhance control authority and stability in both hover and horizontal flight modes. This translation of the pod may also permit greater flexibility in the loading and unloading of cargo, where a broader arrangement of cargo weights, volumes, or sizes can be accommodated.

In an exemplary embodiment, energy storage may be built into the removeable mission modular pods so that an exemplary system includes one air vehicle and a plurality of pods. While the vehicle delivers one pod, the next may be recharged, refueled, or replenished and loaded with a new payload for each mission. Upon its return, the pod being delivered (with expended energy storage) may be removed and a recharged, refueled, or replenished pod may be installed for the next mission. With this approach, total downtime may be minimized (since the aircraft does not need to be recharged, refueled, or replenished) and the potential payload throughput over any given time may be maximized. In another exemplary embodiment, the pod may include batteries which recharge batteries within the aircraft.

An exemplary embodiment may achieve a compact form or footprint by eliminating tail and empennage surfaces. Typical aircraft require tail and empennage surfaces for in-flight stability. However, an exemplary embodiment may support the payload underneath via the autonomously balanced pod and pylon system and may implement thrust vectoring using distributed electric propulsion and autopilot, and therefore may not require stabilizing surfaces.

Landing gear may be integrated into the motor pylons. Motor pylons may rotate into the landing configuration during landing and for storage. The rotation may be accomplished via the same mechanisms that allow for a tilt rotor or tilt wing configuration. For example, the landing gear may be positioned for landing when the rotors and/or wings are positioned for takeoff and/or landing (i.e., in a vertical position). It may be contemplated that the landing gear is sufficiently spaced out such that ground stability during loading and unloading of cargo is enhanced. Spaced out landing gear may also facilitate the vertical takeoff and landing maneuvers.

While in the landed position, an exemplary embodiment may be loaded or unloaded from multiple angles. An automated system may be used to load and unload the cargo. Alternatively, personnel may load and unload the cargo onto the aircraft. The single wing-tilt vehicle layout may allow the vehicle to be loaded or unloaded from multiple angles by reducing potential obstructions that are found in typical aircraft layouts.

An exemplary embodiment may implement distributed electric propulsion by using both RPM control and collective pitch control. RPM control refers to the adjustment of rotation speed of each rotor individually. Motor speed controllers may adjust the RPM of the motors attached to each rotor. In an exemplary embodiment, an autonomous system or control unit may control the motor speed controllers to adjust the RPM.

Electric motors may be used for both vertical and horizontal flight, thus reducing the total number of actuators or traction motors required. Collective pitch variation may increase efficiency in both horizontal and vertical flight configurations. Variable pitch control allows for more responsive control than RPM control alone.

Collective pitch control, as contrasted with cyclic pitch control may refer to altering the angle of all the blades in a rotor. An exemplary embodiment may implement high-speed actuation in pitch of all blades to control the thrust of each individual rotor. This is contrasted with conventional variable pitch propellers on airplanes that actuate relatively slowly. Variable pitch may refer to a propeller changing the pitch angle of the blades. Variable pitch may improve thrust, improve efficiency, or prevent windmilling (a form of modifying the thrust). Collective pitch and variable pitch may require hardware. In an exemplary embodiment, hardware allows the autonomous system to control the aircraft.

In an exemplary embodiment, the high-speed actuation system may implement one or more actuators per rotor. An exemplary actuator may be a closed loop electric actuator for positional control of the pitch of the propeller, however any other compatible actuator may be implemented. The actuator may be a linear or rotary actuator, or any other contemplated type. The actuator may be connected to a mechanical system which may include, for example, linear or rotary linages and gears.

The pitch of one or more propellers may be simultaneously altered in order to adjust the thrust vector of each rotor independently. In an exemplary embodiment, one or more sensors may provide feedback to the actuator. For example, an encoder can provide closed loop feedback to the actuator's position and may correlate the blade's angle of incidence. Other sensors may measure, for example, speed, altitude, heading, and/or acceleration. The sensors may provide flight data to the autopilot system which may evaluate the adjustments needed to achieve the desired flight maneuver.

Figure 13:
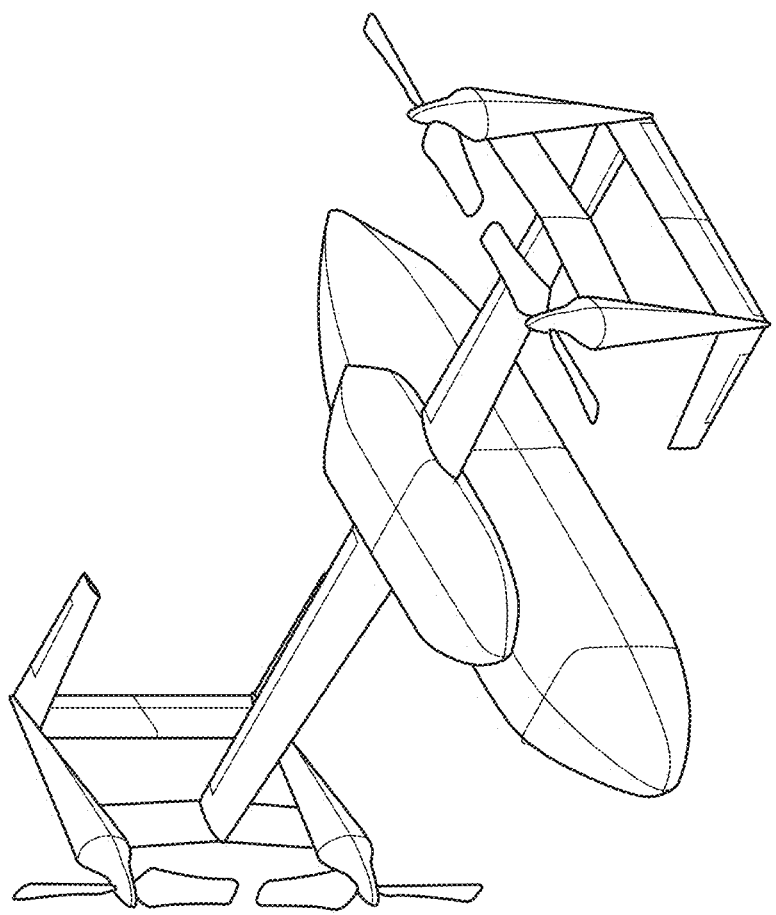
FIG. 13 shows an exemplary embodiment of an aircraft with groups of nacelles separately movable from one another.

FIG. 1A shows an exemplary embodiment of an aircraft. The aircraft 100 may include nacelles 102. The nacelles may house motors for spinning the rotors 104. The rotors may be mounted at the end of the nacelles 102. It may be contemplated that any number of nacelles 102 and rotors 104 may be implemented; the example in FIG. 1A shows the implementation of four nacelles 102 and four rotors 104 for illustrative purposes. The aircraft 100 in FIG. 1A may be in the horizontal flight position, as shown by the front facing rotors 104 and wings 106. A portion of the wings 106 may rotate to face the rotors 104 up or vertically in order to allow for a vertical takeoff or landing. In an alternate exemplary embodiment, the nacelles 102 may rotate separately for a vertical takeoff or landing. The nacelles in this embodiment may act as landing gear in the landing position. In some embodiments, as shown, for example, in FIG. 13, the nacelles on each side (e.g., the upper and lower nacelles on each side) may be grouped and/or linked together for the rotation, with the right-side and left-side groups nacelles being able to move separately from one another.

The exemplary embodiment in FIG. 1A may be carrying a pod 112. The pod 112 may be mounted to pylon 110 on the underside of the fuselage 108. The fuselage may house, for example, a control unit, batteries, and other supporting components. The pod may house additional batteries and/or cargo. The pod 112 may be connected to the fuselage 108 via pylon 110 such that the batteries in the pod 112 can charge or replace the aircraft's batteries.

FIG. 1B may illustrate an exemplary embodiment of an aircraft with aerodynamic stabilizing surfaces that function as integrated landing gear 120. The landing gear 120 may be at the rear end of the nacelles 102 or may be connected to the wings 106. In either case, during landing procedures the nacelles and/or the wings may rotate, thus positioning the landing gear 120 to contact the landing surface.

Figure 2:
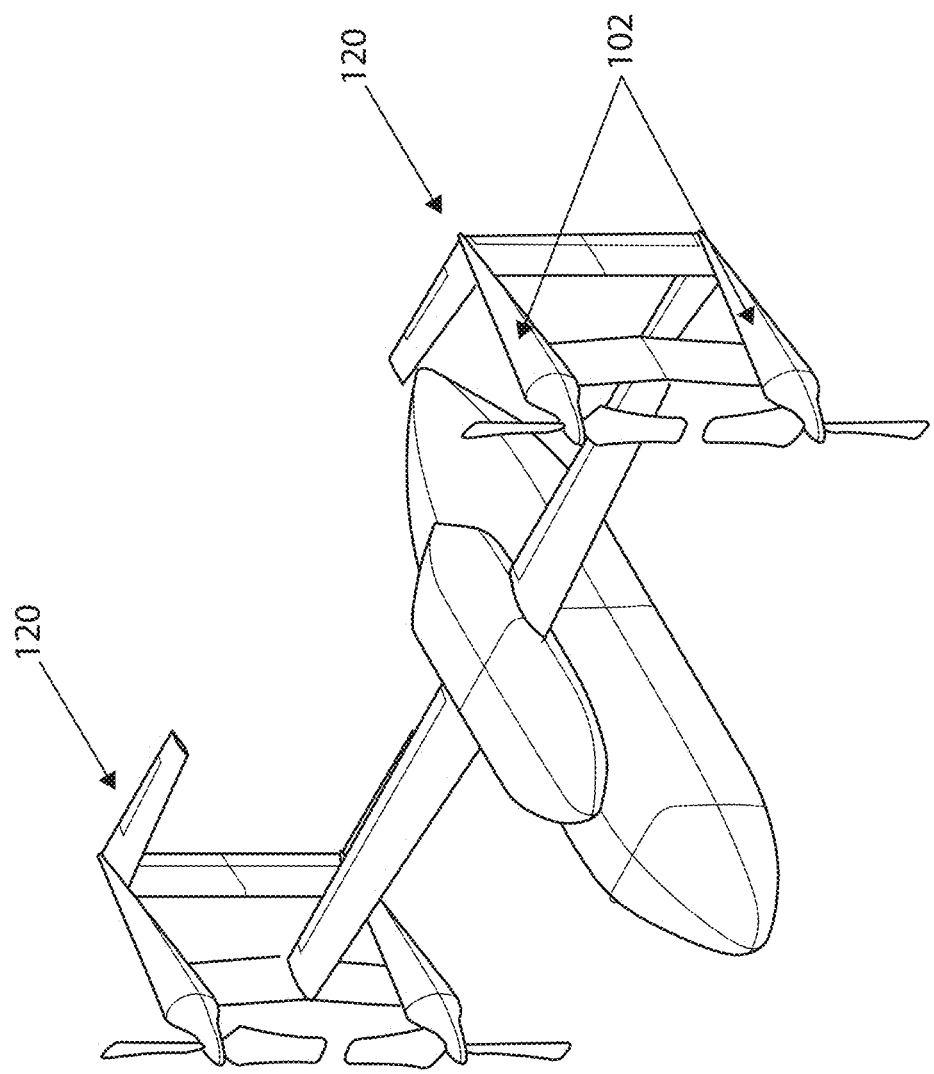
FIG. 2 shows another exemplary embodiment of an aircraft with aerodynamic stabilizing surfaces functioning as integrated landing gear.

Referring now to FIG. 2, FIG. 2 shows another exemplary embodiment of an aircraft. The aircraft in FIG. 2 may be in the horizontal flight position. The exemplary embodiment in FIG. 2 may include landing gear 120 at the rear of the nacelles 102. When the nacelles 102 are rotated for vertical takeoff and landing, the landing gear will also be rotated such that it may contact the landing surface.

Figure 4B:
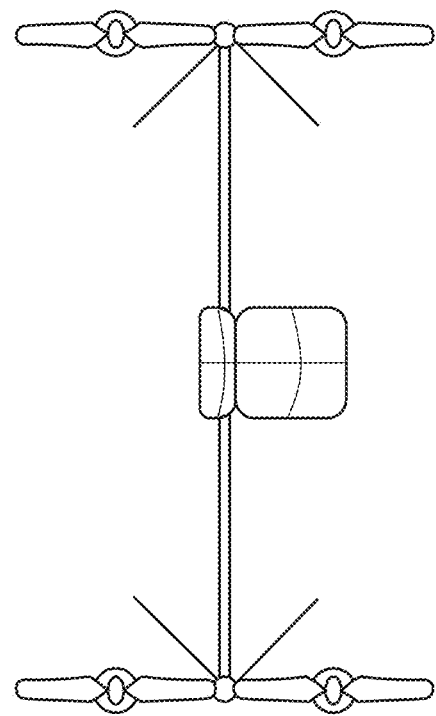
FIG. 4B is a front view of the aircraft of FIG. 3B.
Figure 4A:
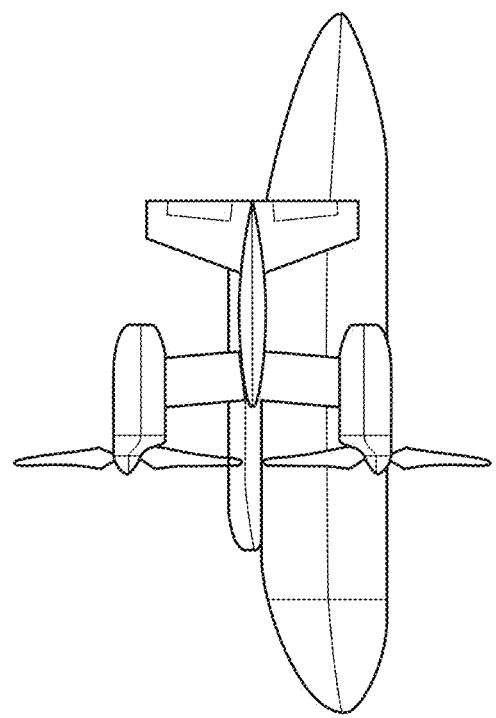
FIG. 4A is a side view of the aircraft of FIG. 3B.

FIGS. 3-4 show views of an alternate embodiment of an aircraft, having a wing and engine configuration similar to the embodiment of FIG. 2, but with an alternate landing gear configuration. FIGS. 3A-3B and 4A-4B show the aircraft with the wing structure in the horizontal flying position, while FIG. 3C shows the aircraft with the wing structure in the vertical takeoff and landing position. In the embodiment of FIGS. 3-4, the aircraft may not include a pylon but may still include the electrical and mechanical connections that enable the benefits of the pylon with regards to energy storage and center of gravity adjustment.

FIG. 5 shows another exemplary embodiment of an aircraft, in the vertical takeoff and landing position. Landing gear 200 may be disposed in between the nacelles on each wing of the aircraft. In the exemplary embodiment of FIG. 5, the wings may also rotate with the nacelles. By rotating the wings, air resistance is lowered during vertical takeoff and landing, thus facilitating takeoff.

Figure 6:
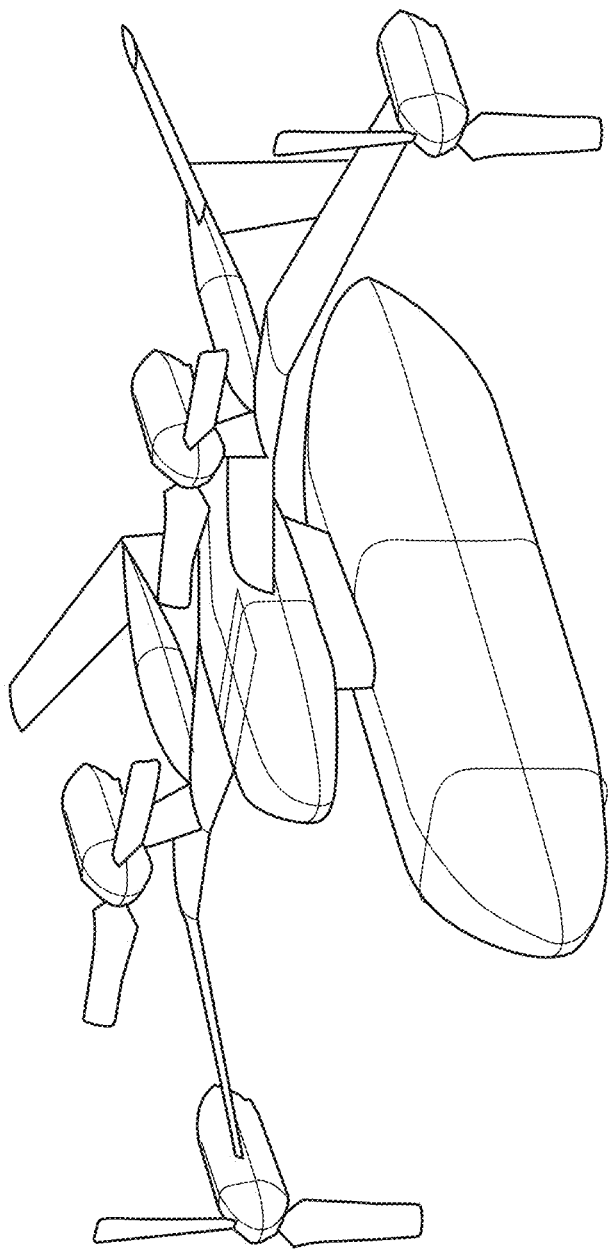
FIG. 6 shows an exemplary embodiment of an aircraft with an alternate wing configuration.

FIG. 6 shows another exemplary embodiment of an aircraft, with an alternate wing configuration. The embodiment of FIG. 7 may include landing gear which is fixed to the rear end of the innermost nacelles. The pylon 110 may connect the pod 112 to the fuselage 108.

Figure 7:
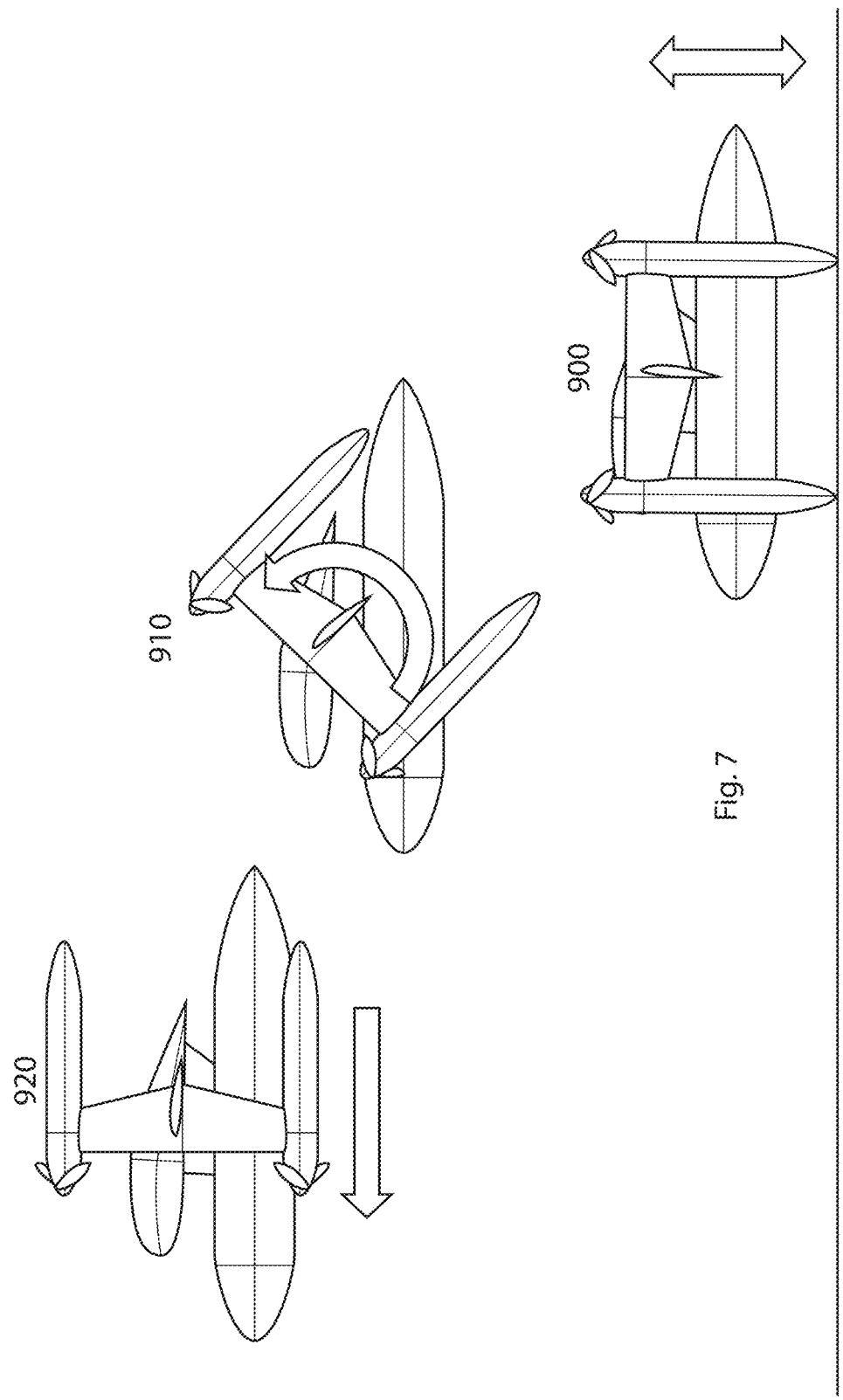
FIG. 7 shows an exemplary takeoff procedure.

FIG. 7 shows an exemplary takeoff procedure. The aircraft may begin in the first position 900, where the landing gear is on the ground and the nacelles and rotors are vertically pointed upwards. Next, the motors may operate, and the thrust of the spinning rotors may lift the aircraft into a hovering position, where the aircraft is hovering off the ground. At this point, the nacelle/wing mechanism may rotate 910 such that the nacelles are horizontally oriented for flight 910. Finally, aircraft 920 may be in the horizontal flight configuration.

FIG. 8 shows an exemplary pod attachment procedure. The pod may be lifted up and attached to the pylon. Alternatively, it may be contemplated that the pylon or a mechanical device attached to the pylon is extended down to interface with and attach to the pod.

FIG. 9 shows an exemplary embodiment of an aircraft in the parking position which fits into a standard 20-foot ISO container.

FIG. 10 shows an alternate exemplary embodiment of an aircraft in the parking position which fits into a standard 20-foot ISO container.

FIG. 11 may illustrate an alternate embodiment of an aircraft, in the vertical takeoff and landing position. The embodiment of FIG. 11 may implement a tilt-wing configuration where both the wings and rotors tilt or rotate. FIG. 12 may illustrate the exemplary embodiment of FIG. 11 in the horizontal flight position.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A vertical takeoff and landing (VTOL) aircraft comprising:
   a fuselage;
   a plurality of wings, each wing having at least a portion configured to rotate into a vertical position for takeoff and landing and rotate into a horizontal position for flight;
   a plurality of nacelles, each nacelle being coupled to a wing of the plurality of wings;
   a plurality of rotors, each rotor being coupled to a corresponding nacelle, the corresponding nacelle housing at least one motor configured to rotate the rotor;
   a flight controller configured to perform collective pitch control of the plurality of rotors, wherein the collective pitch control performs alteration of angles of all blades in each respective rotor, wherein the flight controller is further configured to perform the collective pitch control to produce thrust vectoring that stabilizes a load coupled to the VTOL aircraft, and
   a mission modular pod removably coupled to the VTOL aircraft;

wherein an interface between the mission modular pod and the VTOL aircraft is adjustably configured for movement of a payload relative to a fore-aft axis of the VTOL aircraft and wherein a location of the payload is adjusted autonomously prior to takeoff to set a center of gravity within predefined bounds for enhancing control authority and stability in both hover and horizontal flight modes, and wherein each nacelle of the plurality of nacelles is configured to rotate independently into the vertical position or the horizontal position for the takeoff, flight, and landing.

2. The VTOL aircraft of claim 1, further comprising:
landing gear coupled to one or more nacelles or to one or more wings;
wherein the landing gear is rotated during the takeoff and landing.

3. The VTOL aircraft of claim 1, wherein the flight controller is further configured to perform RPM control of the plurality of rotors and to perform adjustment of rotation speed of each rotor individually.

4. The VTOL aircraft of claim 1, wherein the mission modular pod is removably coupled to the VTOL aircraft at a base of a pylon located at a bottom surface of the VTOL aircraft.

5. The VTOL aircraft of claim 1, further comprising:
a plurality of nacelle pylons, the nacelle pylons comprising one or more of the plurality of nacelles and wherein the nacelle pylons further comprise landing gear; and the nacelle pylons are configured to rotate during takeoff and landing.

6. The VTOL aircraft of claim 5, wherein the landing gear is sufficiently spaced to enhance ground stability during loading and unloading of cargo.

7. The VTOL aircraft of claim 5, wherein the landing gear is sufficiently spaced to facilitate maneuvers during the takeoff and landing.

8. The VTOL aircraft of claim 1, wherein the mission modular pod further comprises energy storage configured to recharge energy storage within the VTOL aircraft.

9. The VTOL aircraft of claim 1, wherein the pylon further comprises motors configured to position the payload relative to the fore-aft axis of the VTOL aircraft.

10. The VTOL aircraft of claim 9, wherein the motors are configured to position the payload to optimize a center of gravity of the VTOL aircraft.

11. The VTOL aircraft of claim 1, wherein both the plurality of rotors and the plurality of wings are configured to rotate in a tilt-wing configuration.

12. The VTOL aircraft of claim 1, wherein the VTOL aircraft is configured to fit into a standard 20-foot freight container.

13. The VTOL aircraft of claim 1, wherein, in a parking position, the VTOL aircraft is configured to be loaded or unloaded from multiple angles.

* * * * *